United States Patent [19]

Wauligman et al.

[11] Patent Number: 4,909,707
[45] Date of Patent: Mar. 20, 1990

[54] CENTRIFUGAL PUMP AND FLOATING CASING RING THEREFOR

[75] Inventors: Kenneth R. Wauligman; Reinhold B. Erickson, both of Cincinnati, Ohio; James H. Ball, Milwaukee, Wis.

[73] Assignee: ITT Corporation, New York, N.Y.

[21] Appl. No.: 310,445

[22] Filed: Feb. 14, 1989

[51] Int. Cl.⁴ .............................................. F04D 29/16
[52] U.S. Cl. ................................ 415/172.1; 415/170.1; 277/174; 384/138; 384/488; 384/901
[58] Field of Search ............... 415/170.1, 172.1, 174.1, 415/174.3; 277/173, 174, 176; 384/138, 901, 488

[56] References Cited

U.S. PATENT DOCUMENTS

| 1,369,508 | 2/1921 | Weiner et al. | 415/172.1 |
| 3,512,788 | 5/1970 | Kilbane | 277/174 |
| 3,779,667 | 12/1973 | Johnson | 415/172.1 |
| 4,018,544 | 4/1977 | Eberhardt | 415/172.1 |

FOREIGN PATENT DOCUMENTS 2007376  8/1978  Fed. Rep. of Germany ... 415/172.1

Primary Examiner—Robert E. Garrett
Assistant Examiner—John T. Kwon
Attorney, Agent, or Firm—Menotti J. Lombardi

[57] ABSTRACT

A centrifugal pump has a floating casing ring which is deflectable in response to contact by an impeller of the pump.

18 Claims, 1 Drawing Sheet

CENTRIFUGAL PUMP AND FLOATING CASING RING THEREFOR

FIELD OF THE INVENTION

The present invention relates to pumps, and, more particularly, to pumps of the centrifugal type.

BACKGROUND OF THE INVENTION

Centrifugal pumps typically employ a wheel with vanes or blades called an impeller. The impeller is mounted on a shaft for rotation within a housing or casing. Fluid is supplied to the eye or center of the impeller through an inlet. As the impeller rotates at high speed, the fluid is impelled around the inner circumference of the casing, thereby applying centrifugal force to the fluid. The housing has a volute shape and is graduated in size from the impeller to an outlet, whereby the flow of the fluid is changed from a high-velocity, low-pressure stream at the inlet to a low-velocity, high-pressure stream at the outlet.

It is common practice to provide a stationary ring between the impeller and the casing. A radial clearance, usually about 0.005 inches to about 0.006 inches, exists between the casing ring and the impeller to permit internal recirculation of the fluid within the pump. A radial clearance, usually about 0.002 inches, exists between the casing ring and the casing. Because the radial clearance between the casing ring and the casing is so small, the casing ring cannot move in a radial direction relative to the casing. Thus, the casing ring, which is made from a softer material than the impeller, becomes worn as the impeller, due to dynamic forces that result in shaft deflection, moves off center and contacts the casing ring. As the radial clearance between the casing ring and the impeller increases due to the wearing of the casing ring, the internal recirculation within the pump increases, thereby adversely affecting pump performance and efficiency.

SUMMARY OF THE INVENTION

In accordance with the present invention, a centrifugal pump is provided with a floating casing ring (i.e., one which deflects in a radial direction in response to contact by an impeller of the pump). As a result of such deflection, the floating casing ring wears at a much slower rate than a stationary (i.e., non-deflectable) casing ring. By reducing wear on the casing ring, the radial clearance between the casing ring and the impeller remains substantially constant so that pump performance and efficiency are not adversely affected.

In one embodiment, the casing ring of the present invention is rendered deflectable by increasing the radial clearance between the casing ring and the casing. One or more seals are provided between the casing and the casing ring in order to prevent fluid from leaking through the radial clearance existing between the casing and the casing ring. By making the seals out of a resilient material having an elastic memory, the seals can also function to urge the casing ring back to its undeflected position.

BRIEF DESCRIPTION OF THE DRAWING

For a better understanding of the present invention reference is made to the following description of one exemplary embodiment considered in conjunction with the accompanying drawing, in which the sole FIGURE is a partial cross-sectional view of a centrifugal pump employing a floating casing ring.

DESCRIPTION OF THE EXEMPLARY EMBODIMENT

Figure 1:
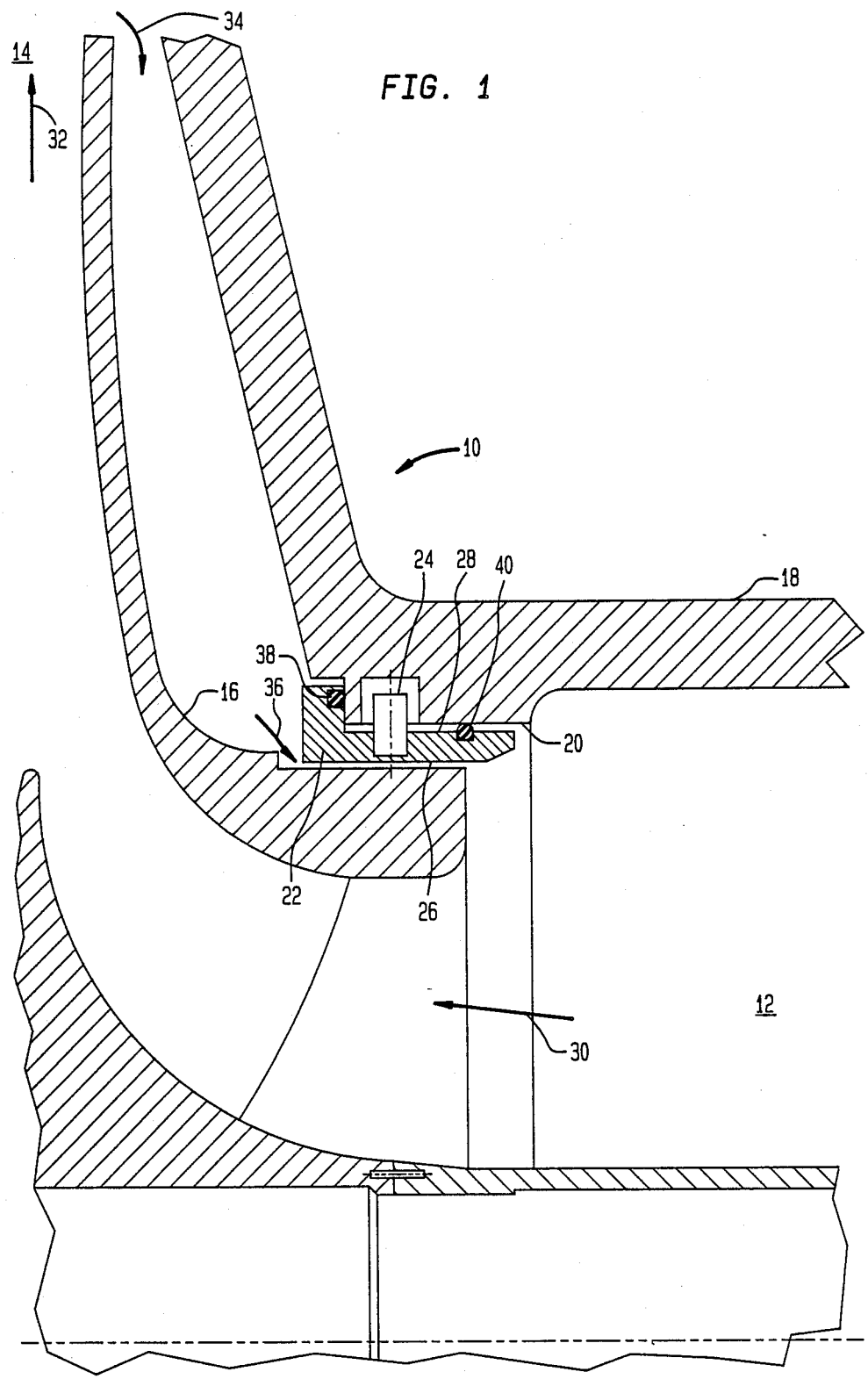

With reference to the sole FIGURE of the drawing, a centrifugal pump 10 has an inlet 12 and an outlet 14. A rotatable impeller 16 is housed in a casing 18, which has a bore 20. A casing ring 22 is positioned between the impeller 16 and the casing 18. The casing ring 18 is prevented from spinning relative to the casing 18 by one or more spiral pins 24 (only one such pin being visible in the sole figure of the drawing).

A radial clearance 26 exists between the impeller 16 and the casing ring 22. The purpose of the radial clearance 26, which is in a range of from about 0.005 inches to about 0.006 inches, will be described hereinafter.

Another radial clearance 28 exists between the casing 18 and the casing ring 22. The purpose of the radial clearance 28, which is in a range of from about 0.050 inches to about 0.051 inches, will also be described hereinafter.

During the operation of the pump 10, fluid is delivered to the impeller 16 through the inlet 12 (see arrow 30). The rotation of the impeller 16 impels the fluid toward the outlet 14 (see arrow 32). Some of the fluid (see arrow 34) is recirculated back through the pump 10. This recirculated fluid flows through the radial clearance 26 which exists between the impeller 16 and the casing ring 22 (see arrow 36). O-rings 38, 40 prevent the recirculated fluid from flowing through the radial clearance 28.

As the impeller 16 rotates, it is subjected to dynamic forces that result in its radial deflection toward the casing ring 22. If such deflection is great enough, the impeller 16 makes contact with the casing ring 22. Because the radial clearance 28 is sufficiently large to permit the casing ring 22 to be deflected in response to its contact by the impeller 16, the wear on the casing ring 22 is reduced. Thus, the radial clearance 26 remains substantially constant (i.e., it is not appreciably enlarged) so that the performance and efficiency of the pump 10 are not adversely affected. Because the O-rings 38, 40 are made from a resilient material having an elastic memory, they also function to urge the casing ring 22 back to its original (i.e., undeflected) position.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What is claimed is:

1. In a casing ring for a centrifugal pump, which pump normally includes a casing to which the casing ring is mounted and an impeller rotatably mounted within the casing such that the casing ring is positioned between the impeller and the casing, the improvement wherein the casing ring is deflectable in response to contact by the impeller, whereby wear on the casing ring is reduced; and wherein a first radial clearance exists between the casing and the casing ring, the first radial clearance being in a range of from about 0.050 inches to about 0.051 inches.

2. An improved casing ring according to claim 1, wherein the casing ring includes sealing means for sealing the first radial clearance so as to prevent the flow of fluid therethrough.

3. An improved casing ring according to claim 2, wherein said sealing means includes a pair of O-rings, each O-ring being made from a resilient material having an elastic memory.

4. An improved casing ring according to claim 3, wherein the O-rings urge the casing ring into an undeflected position.

5. An improved casing ring according to claim 1, wherein a second radial clearance exists between the impeller and the casing ring, the second radial clearance remaining substantially constant due to the reduced wear on the casing ring.

6. An improved casing ring according to claim 5, wherein the second radial clearance is in a range of from about 0.005 inches to about 0.006 inches.

7. A centrifugal pump, comprising a casing, an impeller rotatably mounted within the casing, and a floating casing ring attached to the casing between the casing and the impeller;
   said casing ring being deflectable in response to contact by the impeller, whereby wear on the casing ring is reduced; and
   a first radial clearance between the casing and the casing ring, the first radial clearance being in a range of from about 0.050 inches to about 0.051 inches.

8. A centrifugal pump according to claim 7, wherein the casing ring includes sealing means for sealing the first radial clearance so as to prevent the flow of fluid 9. A centrifugal pump according to claim 8, wherein said sealing means includes a pair of O-rings, each O-ring being made from a resilient material having an elastic memory.

10. A centrifugal pump according to claim 9, wherein the O-rings urge the casing ring into an undeflected position.

11. A centrifugal pump according to claim 7, wherein a second radial clearance exists between the impeller and the casing ring, the second radial clearance remaining substantially constant due to the reduced wear on the casing ring.

12. A centrifugal pump according to claim 11, wherein the second radial clearance is in a range of from about 0.005 inches to about 0.006 inches.

13. A method of reducing the wear on a casing ring of a centrifugal pump, which pump normally includes a casing to which the casing ring is mounted and an impeller rotatably mounted within the casing such that the casing ring is positioned between the impeller and the casing, said method comprising the steps of mounting the casing ring such that it is deflectable in response to contact by the impeller; and
   providing first radial clearance between the casing and the casing ring, the first radial clearance being in a range of from about 0.050 inches to about 0.051 inches.

14. A method according to claim 13, further comprising the step to sealing the first radial clearance so as to prevent the flow of fluid therethrough.

15. A method according to claim 14, wherein the first radial clearance is sealed by a pair of O-rings, each O-ring being made from a resilient material having an elastic memory.

16. A method according to claim 15, wherein the O-rings urge the casing ring into an undeflected position.

17. A method according to claim 13, wherein a second radial clearance exists between the impeller and the casing ring, the second radial clearance remaining substantially constant due to the reduced wear on the casing ring.

18. A method according to claim 17, wherein the second radial clearance is in a range of from about 0.005 inches to about 0.006 inches.

* * * * *